US012565859B2

(12) United States Patent (10) Patent No.: US 12,565,859 B2
Scharfenberg et al. (45) Date of Patent: Mar. 3, 2026

(54) INTEGRATED AIR TURBINE STARTER

(71) Applicant: Hamilton Sundstrand Corporation, Charlotte, NC (US)

(72) Inventors: James Scharfenberg, Rockford, IL (US); August Metzler, Machesney Park, IL (US); Michael Blewett, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/750,505

(22) Filed: Jun. 21, 2024

(65) Prior Publication Data

US 2025/0389228 A1 Dec. 25, 2025

(51) Int. Cl.
| | |
|---|---|
| *F02C 7/32* | (2006.01) |
| *F02C 7/277* | (2006.01) |
| *F02C 7/36* | (2006.01) |
| *F16H 57/023* | (2012.01) |

(52) U.S. Cl.
CPC .............. *F02C 7/32* (2013.01); *F02C 7/277* (2013.01); *F02C 7/36* (2013.01); *F05D 2230/80* (2013.01); *F05D 2260/40311* (2013.01); *F16H 2057/0235* (2013.01)

(58) Field of Classification Search
CPC ........ F02C 7/32; F02C 7/277; F05D 2230/51; F05D 2230/52; F05D 2230/61; F16D 2300/12; F16D 2131/00; F16H 2057/0235; F16H 57/031
See application file for complete search history.

(56) References Cited

U.S. PATENT DOCUMENTS

| | | | | |
|---|---|---|---|---|
| 2,890,772 | A * | 6/1959 | Bixby | ................... F16H 57/037 475/198 |
| 2,940,562 | A * | 6/1960 | Petrossi | ................. F16D 13/42 192/110 S |
| 8,876,476 | B2 * | 11/2014 | Blewett | ..................... F02C 7/32 416/170 R |
| 9,897,010 | B2 * | 2/2018 | Libera | ..................... F01D 25/20 |
| 11,959,387 | B2 | 4/2024 | Kurvinkop et al. | |
| 2018/0030900 | A1 | 2/2018 | Mathis et al. | |

* cited by examiner

*Primary Examiner* — Stephanie Sebasco Cheng
(74) *Attorney, Agent, or Firm* — Kinney & Lange, P.A.

(57) ABSTRACT

An air turbine starter (ATS) assembly for an aircraft has an ATS mounted to an accessory drive gearbox. The ATS includes an ATS output shaft is configured to pass from the ATS into the accessory drive gearbox. The accessory drive gearbox includes an overrunning clutch assembly configured to rotationally connect the ATS output shaft to an accessory gearbox shaft when the overrunning clutch engages the ATS output shaft such that the overrunning clutch assembly transmits rotational energy from the ATS output shaft to an accessory gearbox shaft. The overrunning clutch assembly is configured to permit the accessory gearbox shaft to rotate independent of the ATS output shaft when the overrunning shaft is disengaged from the ATS output shaft. The overrunning clutch assembly is configured to be removeable from the accessory drive gearbox as a removeable clutch cartridge.

13 Claims, 8 Drawing Sheets

14

48

52

50

INTEGRATED AIR TURBINE STARTER

The present disclosure relates generally to an air turbine starter and, more particularly, to an air turbine starter integrated with an accessory drive gearbox.

An air turbine starter (ATS) is the primary method for rotating an aircraft engine to reach ignition. An ATS typically includes a turbine, gears, and a clutch. Compressed air drives the turbine, which in turn drives the aircraft engine. Once the aircraft engine is running at a desired speed, compressed air to the ATS is shut off and the clutch disengages the ATS. An ATS is typically a line replaceable unit (LRU), meaning that mechanics can replace it on a flight line, mounted on a gearbox.

ATS systems have many, complex moving parts, tight installation envelopes, and strict weight and overhang moment requirements imposed by customers. Overhang moment refers to the load that the ATS imparts of the gearbox to which it is mounted based on the ATS's weight and center of gravity. It is desirable to reduce ATS weight, complexity, overhang moment, and size of these aircraft systems.

SUMMARY

One aspect of this disclosure is directed to an air turbine starter (ATS) assembly for an aircraft having an ATS mounted to an accessory drive gearbox. The ATS includes an air inlet configured to direct pressurized air into the ATS and across a plurality of turbine blades of a turbine assembly positioned in the ATS. The turbine assembly is configured to rotate when pressurized air is directed across the plurality of turbine blades. An air outlet is configured to direct pressurized air exiting the plurality of turbine blades out of and away from the ATS. A set of planetary gears is rotationally connected to the turbine assembly and a floating ring gear is rotationally connected to the set of planetary gears. The set of planetary gears is configured to transmit rotational energy from the turbine assembly to the floating ring gear. An ATS output shaft rotationally connected to the floating ring gear, which is configured to transmit rotational energy from the to the ATS output shaft. The ATS output shaft is configured to pass from the ATS into the accessory drive gearbox. The accessory drive gearbox includes an overrunning clutch assembly configured to rotationally connect the ATS output shaft to an accessory gearbox shaft when the overrunning clutch engages the ATS output shaft such that the overrunning clutch assembly transmits rotational energy from the ATS output shaft to an accessory gearbox shaft. The overrunning clutch assembly is configured to permit the accessory gearbox shaft to rotate independent of the ATS output shaft when the overrunning shaft is disengaged from the ATS output shaft. The overrunning clutch assembly, which is configured to be removeable from the accessory drive gearbox as a removeable clutch cartridge, includes an outer clutch shaft, a clutch element, and an inner clutch shaft. The accessory gearbox shaft is configured to rotationally connect to a power take off shaft of an aircraft engine to transmit rotational energy from the ATS output shaft to the power take off shaft when the overrunning clutch assembly engages the ATS output shaft.

Another aspect of this disclosure is directed to a method of operating an air turbine starter (ATS) assembly. Pressurized air is directed into an air inlet configured to direct the pressurized air into an ATS and across a plurality of turbine blades of a turbine assembly positioned in the ATS, causing the turbine assembly to rotate. Pressurized air exiting the plurality of turbine blades is directed through an air outlet to direct the pressurized air out of and away from the ATS. A set of planetary gears and a floating ring gear rotationally connected to the set of planetary gears transmit rotational energy from the turbine assembly to an ATS output shaft. The ATS output shaft is positioned in the ATS and is configured to pass from the ATS into an adjoining accessory drive gearbox. An overriding clutch assembly positioned in the accessory gearbox is caused to engage the ATS output shaft, thereby transmitting rotational energy from the ATS output shaft to an accessory gearbox shaft connected to the overriding clutch assembly. The accessory gearbox shaft is configured to facilitate starting of a connected aircraft engine by transmitting rotational energy to the connected aircraft engine through a power take off shaft rotationally connected to the accessory gearbox shaft. The overriding clutch assembly is caused to disengage the ATS output shaft after the connected aircraft engine starts, whereby the accessory gearbox shaft is permitted to rotate with the aircraft engine and independent of the ATS output shaft.

Another aspect of this disclosure is directed to a method of replacing an overrunning clutch assembly in an air turbine starter (ATS) assembly. A first overrunning clutch assembly, which is configured as a removeable clutch cartridge, is from an accessory gearbox of the ATS assembly. A second overrunning clutch assembly, which is configured to replace the first overrunning clutch assembly, is inserted into the accessory gearbox.

DETAILED DESCRIPTION

Integrating an air turbine starter (ATS) into the gearbox on which it is mounted, such as an airframe mounted accessory drive (AMAD) gearbox or an engine mounted accessory drive gearbox, allows ATS components to be rearranged and modified to achieve desired weight and overhang moment reductions and to reduce complexity. While this disclosure will focus on an ATS mounted to an AMAD gearbox, a person of ordinary skill will recognize that the disclosure applies equally well to an ATS mounted to an engine mounted accessory drive gearbox or any other appropriate gearbox.

Figure 1:
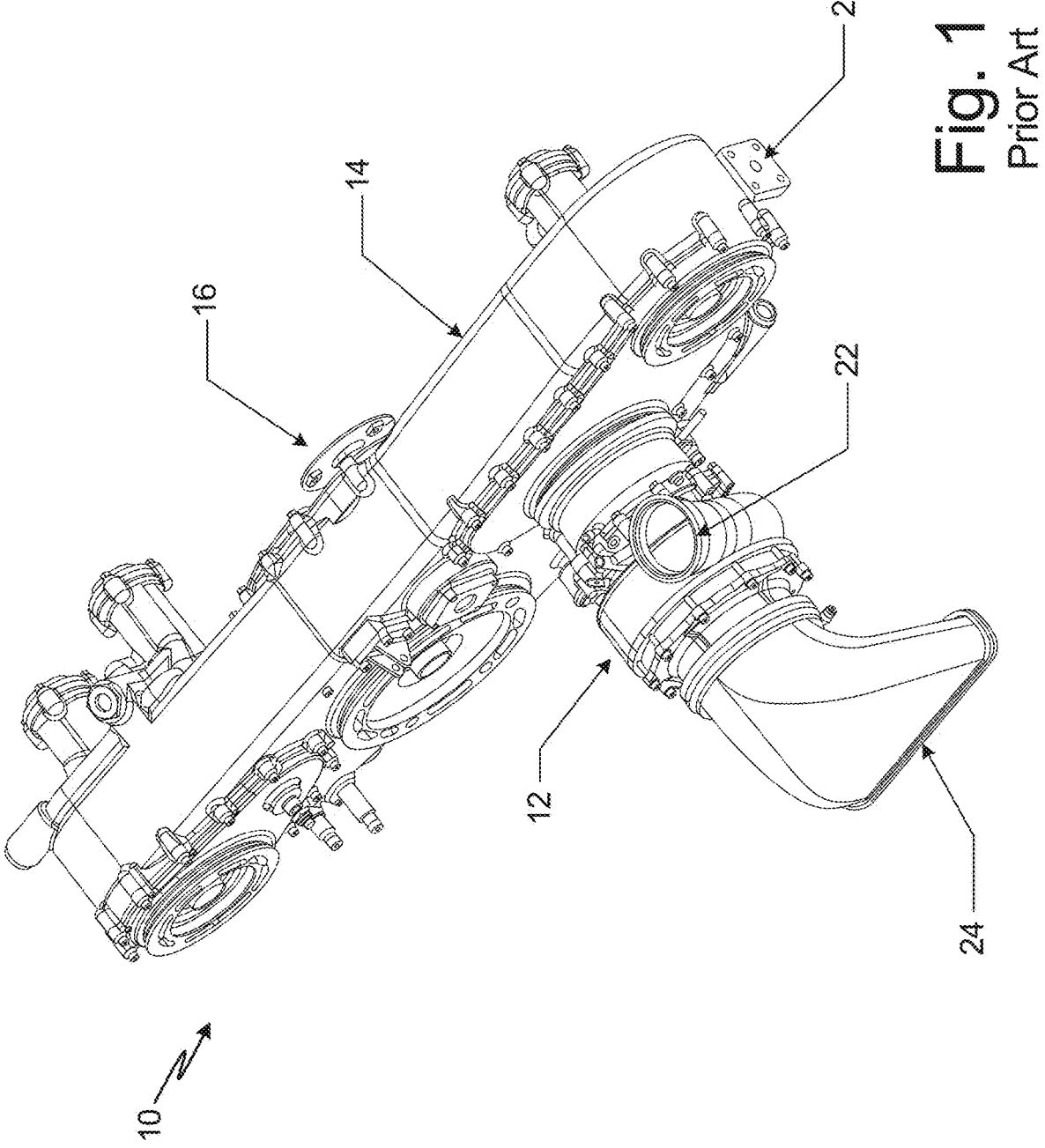
FIG. 1 is a perspective view of a prior art air turbine starter (ATS) installed on an airframe mounted accessory drive (AMAD) gearbox.
Figure 2:
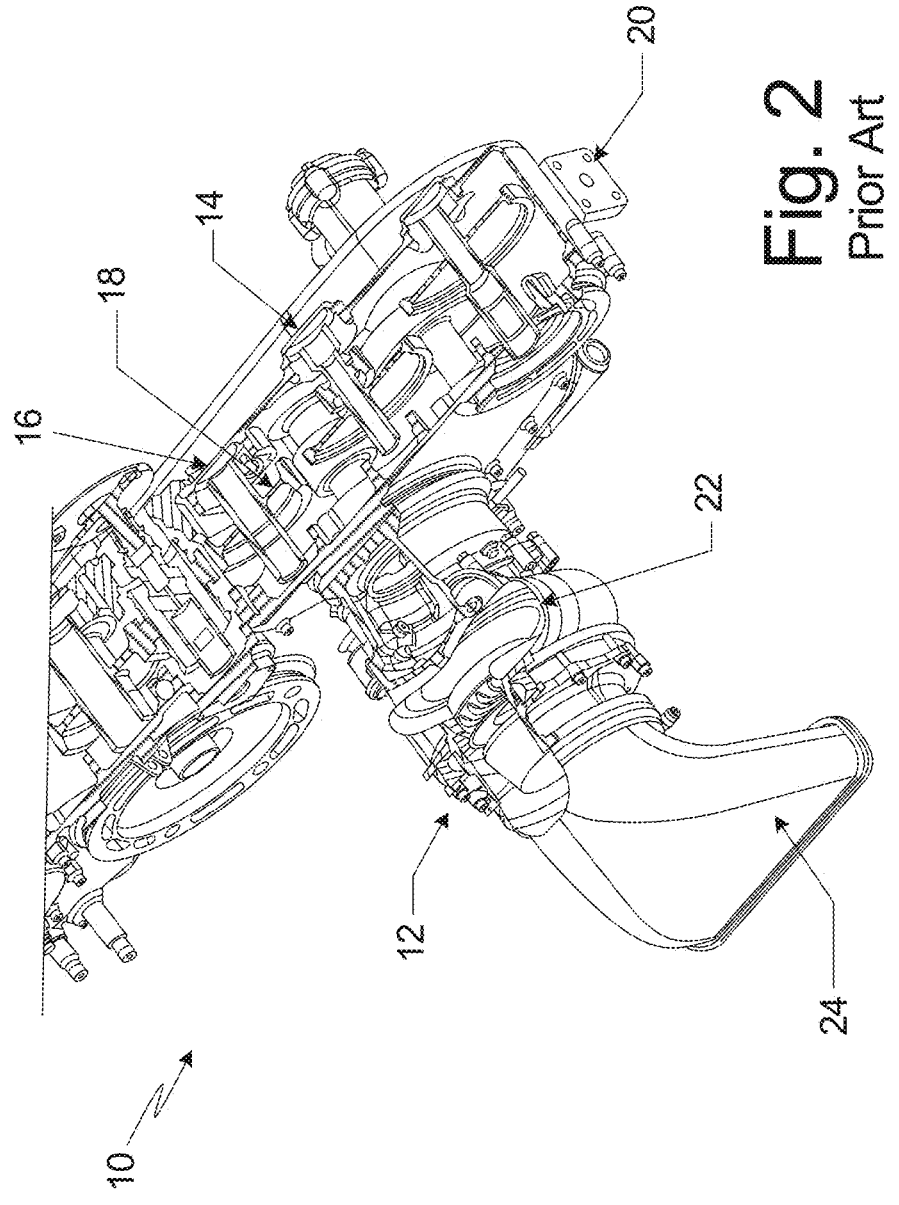
FIG. 2 is cutaway view of the ATS of FIG. 1 showing an AMAD geartrain.

Before focusing on the integrated ATS of this disclosure, this disclosure will discuss a conventional ATS assembly 10 as shown in FIGS. 1-6 to provide a general description of ATS operation and a basis for comparison with the integrated ATS that is the focus of this disclosure. As shown in FIGS. 1 and 2, a conventional ATS assembly 10 includes an ATS 12 mounted to an AMAD gearbox 14. The ATS 12 is rotationally coupled to power take-off shaft (PTS) 16 thru a geartrain 18 (see FIG. 2). The PTS 16 is rotationally connected to an aircraft engine (not shown), which is typically a gas turbine engine. The AMAD gearbox 14 is fixed to an aircraft structure (not shown) using AMAD mounting features 20. An ATS air inlet 22 is configured to receive pressurized air from an external source, such as an air compressor (not shown). Pressurized air enters the ATS air inlet 22 and exits the ATS through an ATS air outlet 24.

The engine start sequence begins when pressurized air entering the ATS air inlet 22 causes the ATS 12 to rotate which, in turn, causes the PTS 16 and aircraft engine (not shown) to rotate. Rotation of the ATS 12 continues until a desired cutout speed is achieved and the aircraft engine lights (i.e., a fuel/air mixture in the aircraft engine's combustor ignites). After cutout speed is achieved, the pressurized air source is turned off and the ATS 12 goes into over-running mode. As known in the art, an over-running (or freewheeling) mode occurs in a mechanical system when a clutch on a drive shaft is disengaged, permitting the drive shaft to rotate without restriction.

Figure 3:
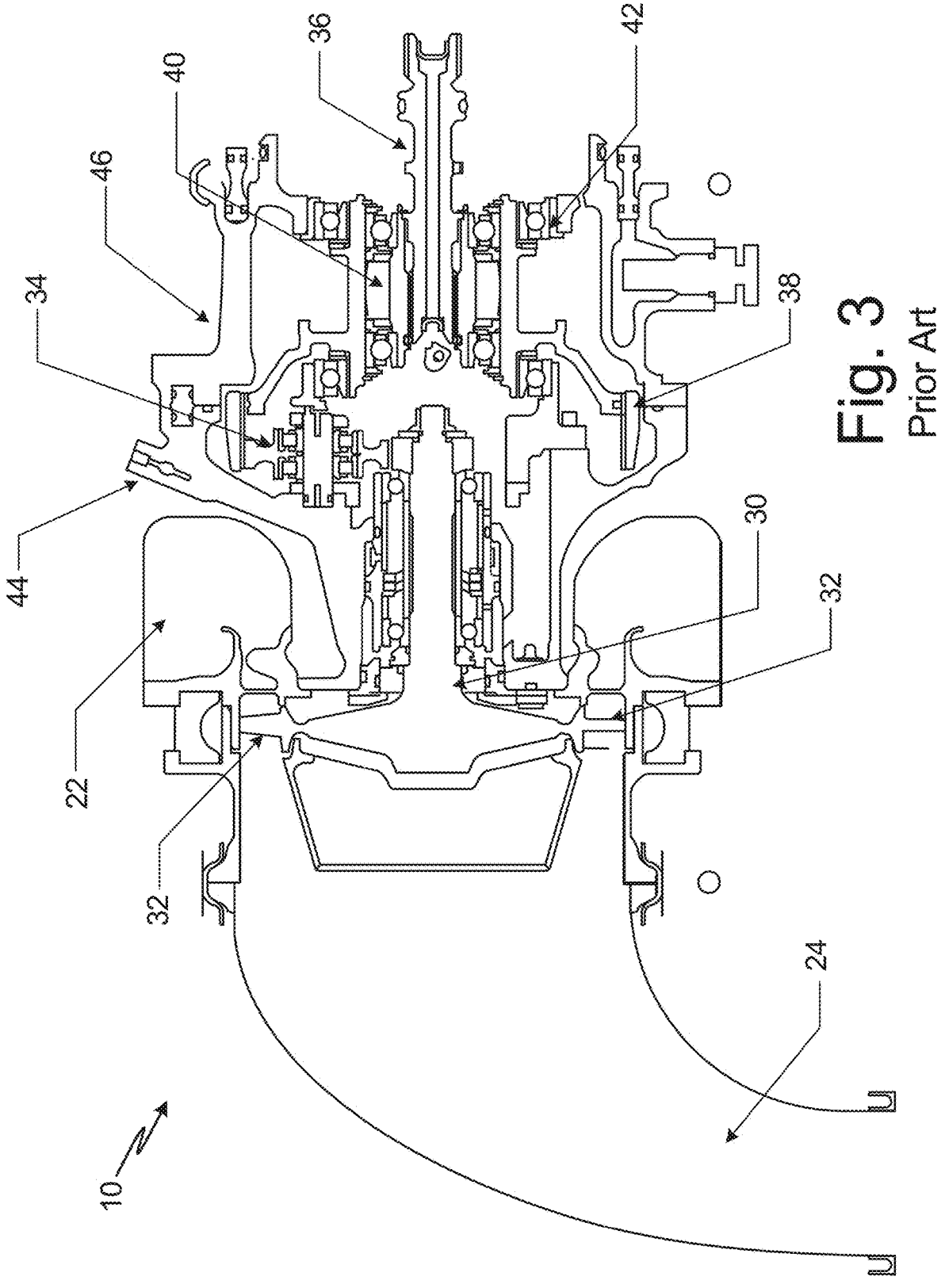
FIG. 3 is a schematic view of prior art ATS.

Inside the ATS 12 as shown in FIG. 3, the engine start sequence begins when pressurized air enters the ATS 12 at the air inlet 22 and is directed to the turbine blades 32 of the turbine assembly 30. Pressured air impinges on the turbine blades 32 causing the turbine assembly 30 to rotate. After the pressured air passes across the turbine blades 32, the pressurized air exits the ATS 12 thru the ATS air outlet 24. The turbine assembly 30 is rotationally connected to a set of planetary gears 34. The purpose of the planetary gears 34 is to reduce the speed and increase the torque transmitted from the turbine assembly 30 to an ATS output shaft 36 to a level appropriate for an aircraft engine start. The output of the planetary gearing is a ring gear 38 which is attached to an overrunning clutch assembly 40. The overrunning clutch assembly 40 is supported by two clutch assembly bearings 42. During the engine start, overrunning clutch assembly 40 is locked to the ATS output shaft 36 as will be described below.

Figure 4:
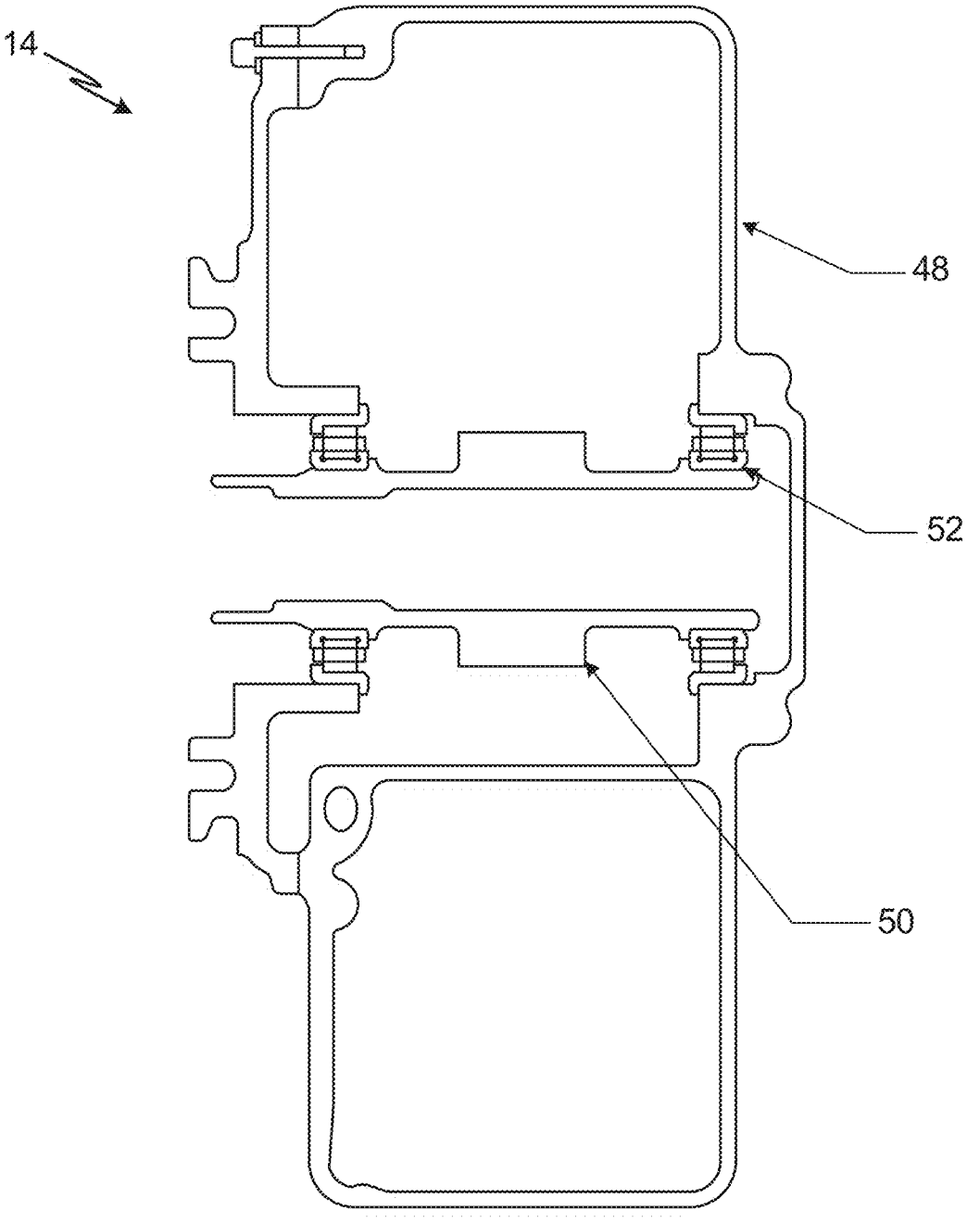
FIG. 4 is a schematic view of a prior art AMAD gearbox.

The ATS output shaft 36 is rotationally connected to, and pilots into the ATS gear shaft 50 in the AMAD gearbox 14 using a spline shaft coupling or other appropriate mechanical coupling as shown in FIG. 4. The ATS gear shaft 50 in the AMAD gearbox 14 is supported by two gear shaft bearings 52 which are mounted into the AMAD gearbox housing 48.

Returning to FIG. 3, the turbine assembly 30, planetary gearing 34, and overrunning clutch assembly 40 are disposed within the turbine housing 44 and the transmission housing 46, which are rigidly attached together As shown in FIG. 4, the overrunning clutch assembly 40 is configured to couple an outer clutch shaft 54 to the ATS output shaft 36 during aircraft engine start and to decouple the ATS output shaft 36 from the outer clutch shaft 54 during aircraft engine operation after aircraft engine light off. In the decoupled, or overrunning mode, the outer clutch shaft 54 and the remainder of ATS components (i.e., the turbine assembly 30 and planetary gears 34) do not rotate. The overrunning mode is required to prevent overspeed of the turbine assembly 30 after aircraft engine light off.

Clutch element 56, which can be a sprag clutch arrangement or any other appropriate clutch arrangement, enables the overrunning mode by allowing torque to be transmitted from the ATS output shaft 36 in one rotation direction but allows the ATS output shaft 36 to freewheel in the opposite direction. The clutch element 56 is disposed between an inner clutch shaft 58 and the outer clutch shaft 54. The inner clutch shaft 58 is supported by two inner clutch bearings 60 and is coupled to the ATS output shaft 36.

Figure 5:
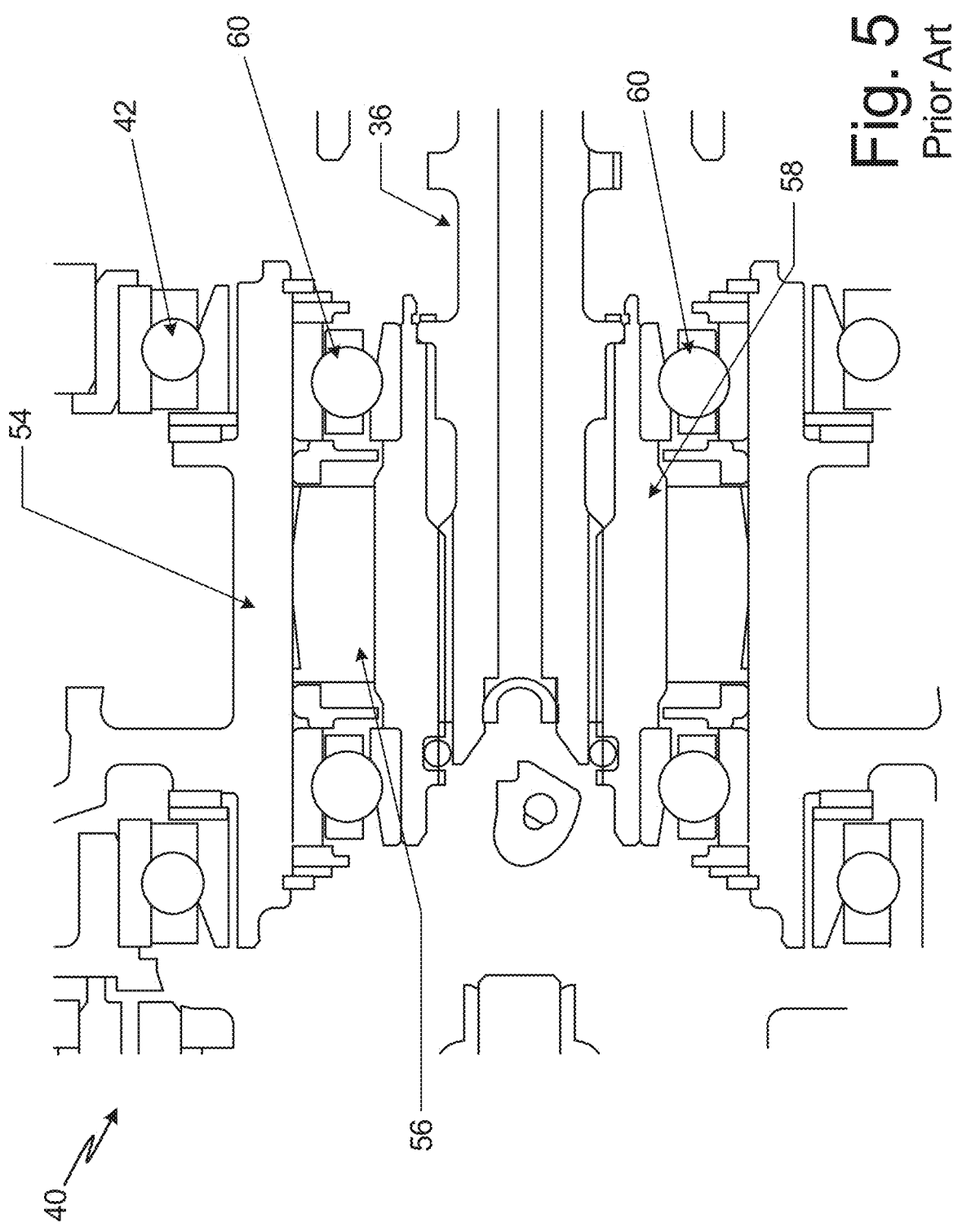
FIG. 5 is a schematic view of a prior art ATS clutch assembly.
Figure 6:
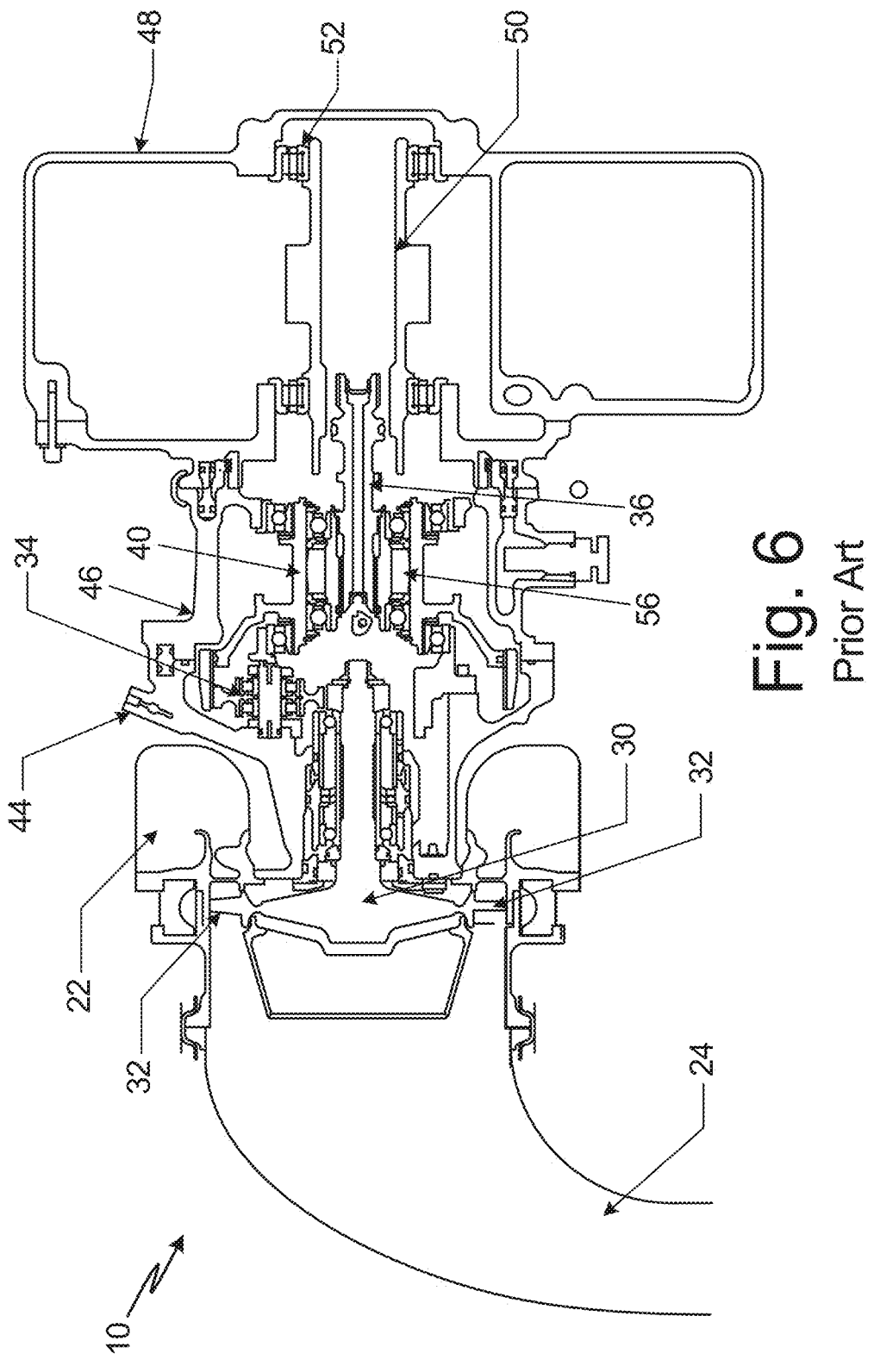
FIG. 6 is a schematic view of a prior art ATS installed on an AMAD gearbox.

FIG. 6 shows an overhead view of the elements shown in FIGS. 3-5.

Figure 7:
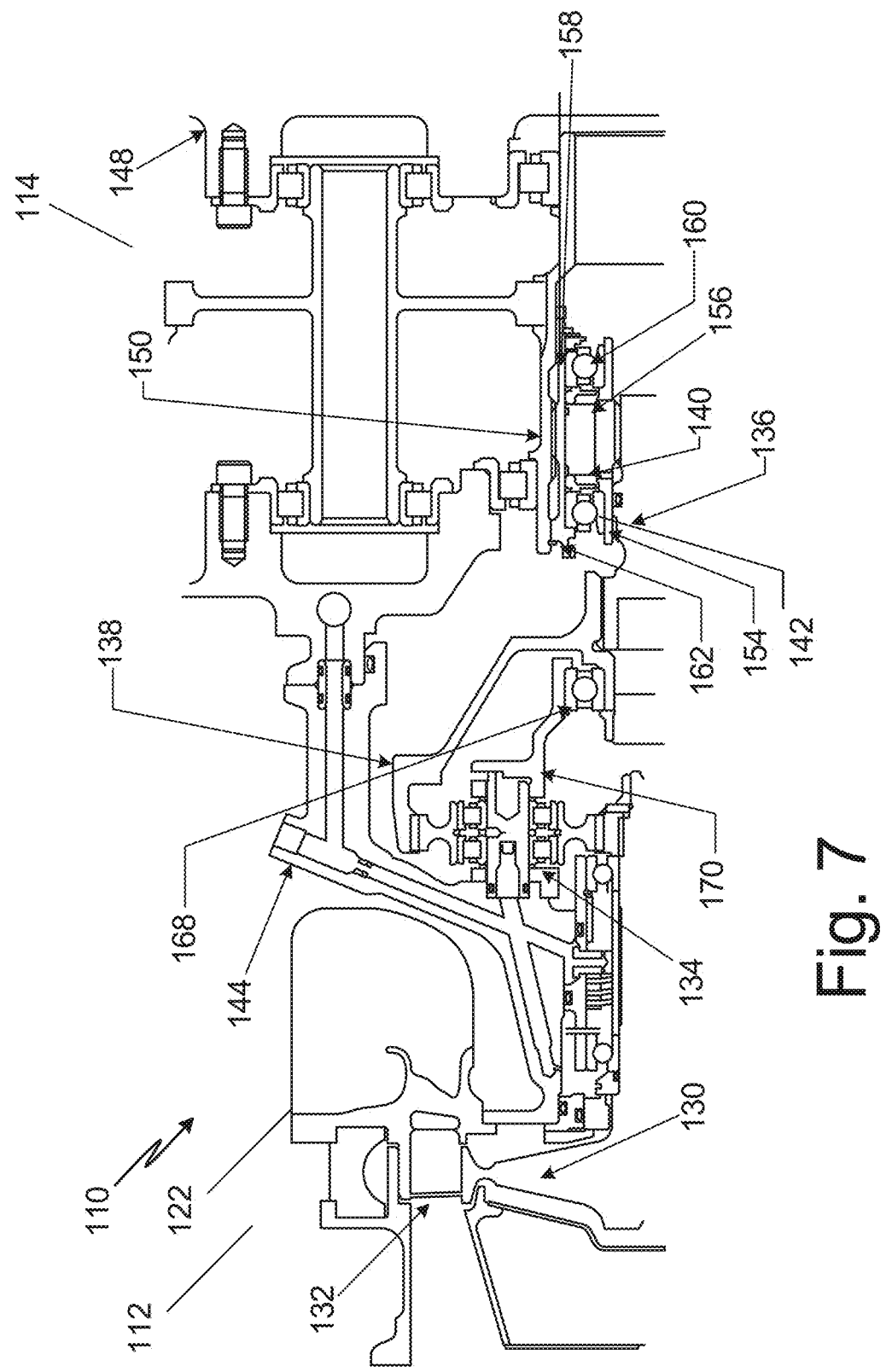
FIG. 7 is a schematic view of an ATS of the present disclosure having a clutch assembly integrated into an AMAD gearbox.

As discussed briefly above, integrating certain components associated with an ATS into the gearbox on which it is mounted, such as an airframe mounted accessory drive (AMAD) gearbox or engine mounted accessory drive gearbox, allows ATS components to be rearranged and modified to achieve desired weight and overhang moment reductions and to reduce complexity. FIG. 7 shows such an arrangement for ATS assembly 110, which relocates overrunning clutch assembly 140 from ATS 112 into the AMAD gearbox 114. The overrunning clutch assembly 140 is disposed within a removable clutch cartridge 162 that is rotationally connected to the AMAD gear shaft 150. Relocating the overrunning clutch assembly 140 to the AMAD gearbox 114 enables a floating ring gear 138 arrangement that can be supported by a single ring gear bearing 168 mounted into the planetary carrier 170. Additionally, the support structure for the floating ring gear 138 allows elimination of the ATS transmission housing used in the conventional configuration described above so that the turbine housing 144 can be mounted directly to the AMAD gearbox housing 148. These improvements lead to an overall simplification, weight reduction, and reduction in overhang moment of the combined ATS/AMAD gearbox arrangement of FIG. 7 compared with the convention configuration of FIGS. 1-6.

Maintainability of the overrunning clutch assembly 140 of FIG. 7 is facilitated by configuring the overrunning clutch assembly 140 with a removable clutch cartridge 162. As the overrunning clutch assembly 140 wears with normal use, removal and replacement of the overrunning clutch assembly 140 is accomplished by removing the ATS 112 from the AMAD gearbox housing 148 and then removing and replacing the clutch cartridge 162 containing the overrunning 140. The clutch cartridge 162 can be a sub-assembly that is easily accessible in the AMAD gearbox 114, either by removing a clutch access cover 272 as described below or being readily available after removal of the ATS 112 from the gearbox housing 148. In one example, unbolting two clutch assembly bearings 142/242 (described below) allows the entire clutch assembly 140 to slide free. Because the ATS 112 does not include a clutch assembly as is the case with conventional ATS 12 described above, the ATS 112 is smaller and lighter than the conventional ATS 12, making the ATS 112 is easier to remove from the AMAD gearbox housing 148 than the conventional ATS 12. The AMAD gearbox 114 does not need to be removed from the aircraft to replace the clutch cartridge 162 containing the overrunning clutch assembly 140. The ease of replacing the clutch cartridge 162 containing the overrunning clutch assembly 140, means that mechanics on a flight line can treat the clutch cartridge 162 containing the overrunning clutch assembly 140 as a line replaceable unit (LRU). Following replacement, the worn clutch cartridge 162 containing the overrunning clutch assembly 140 can be sent to an appropriate repair station for refurbishment and reuse. The ease of replacing clutch cartridge 162 containing the overrunning clutch assembly 140 compared with replacing an entire conventional ATS 12, results in reduced maintenance time and cost compared to a conventional ATS 12.

Figure 8:
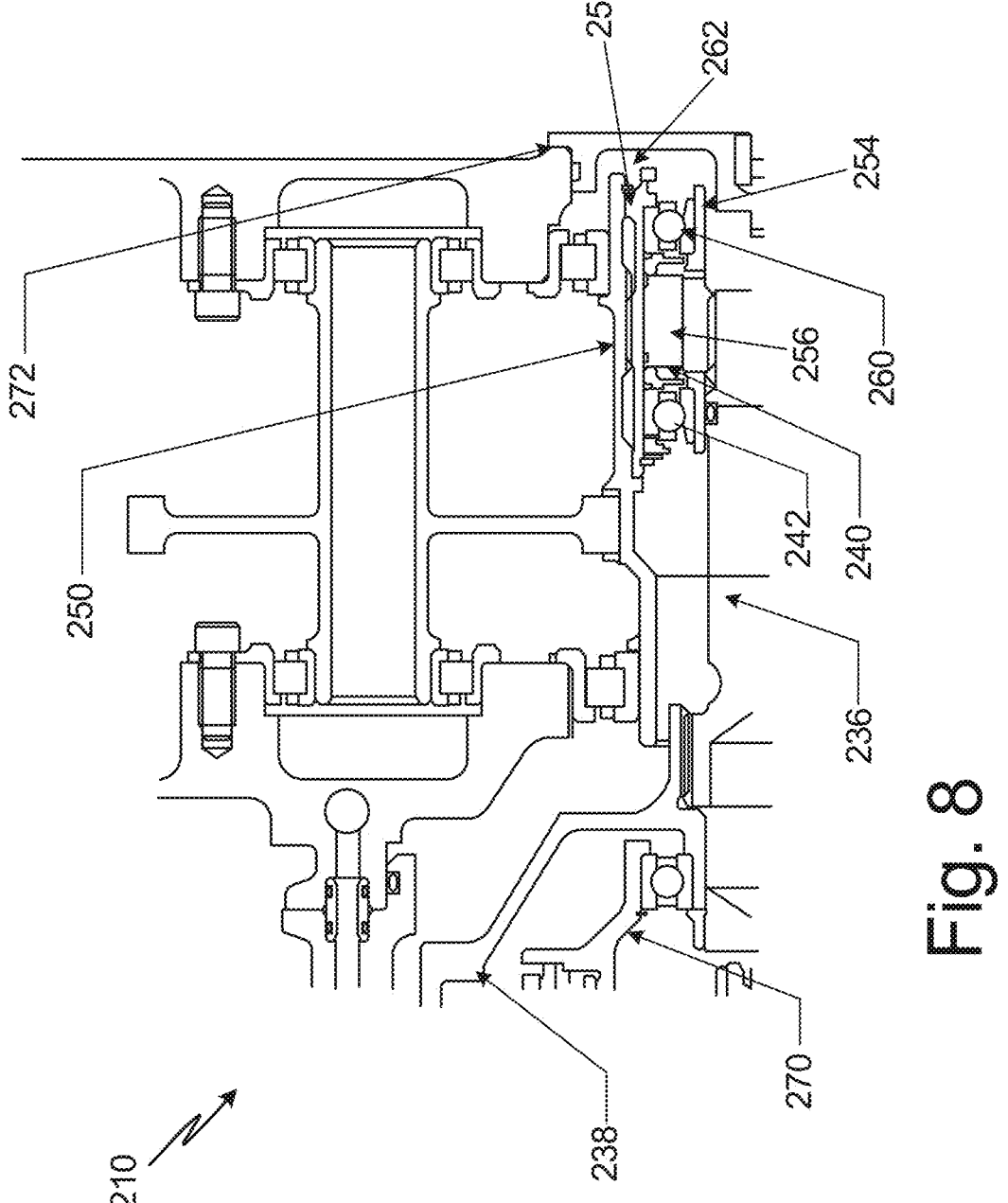
FIG. 8 is a schematic view of an alternate configuration of an AMAD gearbox having an integrated ATS clutch assembly.

FIG. 8 shows an alternate configuration in which the overrunning clutch assembly 240 and removable clutch cartridge 262 can be accessed from the anti-drive end of the AMAD gear shaft 250 (i.e., a side of the AMAD gearbox 214 opposite a side on which the ATS is mounted) by removing a clutch access cover 272. This allows for reduced maintenance time because a worn or failed overrunning clutch assembly 240 can be removed and replaced without removing the ATS 112 (see FIG. 7 for the corresponding structure) from the AMAD gearbox 214. FIG. 8 also shows clutch element 256, inner clutch shaft 254, outer clutch shaft 258, inner clutch bearings 260, and planetary carrier 270 which correspond generally with the similar elements of FIG. 7, clutch element 156, inner clutch shaft 154, outer clutch shaft 158, inner clutch bearings 160, and planetary carrier 170.

The integrated ATS assemblies 110 and 210 of FIGS. 7 and 8 operate in essentially the same way as the conventional ATS assembly 10 described above with regard to FIGS. 1-6. Pressurized air enters the ATS 112 at the air inlet 122 and directed to the turbine blades 132 of the turbine assembly 130. Pressured air impinges on the turbine blades 132 causing the turbine assembly 130 to rotate. The turbine assembly 130 is rotationally connected to a set of planetary gears 134. The output of the planetary gearing 134 is a floating ring gear 138/238 which is attached to ATS output shaft 136/236. ATS output shaft 136/236 is in turn attached to the overrunning clutch assembly 140/240, which as discussed above, is configured as a line replaceable clutch cartridge 162/262. The overrunning clutch assembly 140/240 is supported by two clutch assembly bearings 142/242, only one of which is visable in the views of FIGS. 7 and 8. During the engine start, overrunning clutch assembly 140/240 is locked to the ATS output shaft 136/236.

The ATS output shaft 136 is rotationally connected to AMAD gear shaft 150/250 in the AMAD gearbox 114/214 through the overrunning clutch assembly 140/240. The AMAD gear shaft 150/250 in the AMAD gearbox 114/214 is supported by two clutch assembly bearings 142/242.

As shown in FIG. 7, the overrunning clutch assembly 140 is configured to couple the AMAD gear shaft 150 to the ATS output shaft 136 during aircraft engine start and to decouple the ATS output shaft 136 from the AMAD gear shaft 150 during aircraft engine operation after aircraft engine light off. In the decoupled, or overrunning mode, the ATS output shaft 136 and the remainder of ATS components (i.e., the turbine assembly 130 and planetary gears 134) do not rotate. The overrunning mode is required to prevent overspeed of the turbine assembly 130 after aircraft engine light off.

Clutch element 156, which can be a sprag clutch arrangement or any other appropriate clutch arrangement, enables the overrunning mode by allowing torque to be transmitted to the AMAD gear shaft 150 in one rotation direction but allows the AMAD gear shaft 150 to freewheel in the opposite direction. The clutch element 156 is disposed between an inner clutch shaft 154 and the outer clutch shaft 158. The inner clutch shaft 158 is supported by two inner clutch bearings 160, only one of which is visible in the views of FIGS. 7 and 8 (as inner clutch bearings 260), and is coupled to the ATS output shaft 136.

As discussed above, the integral ATS assembly 110/210 of this disclosure provides several advantages over a conventional ATS assembly 10. Moving the overrunning clutch assembly 40 from the ATS 12 into the AMAD gearbox 114/214 integrates the overrunning clutch assembly 140/240 with the AMAD gear shaft 150/250. The result is a simplified, lighter weight ATS 112 that has a reduced overhang moment. In addition, the positioning the overrunning clutch assembly 140/240 in a removable clutch cartridge 162/262 allows the clutch assembly 140/240 to be treated as a LRU—enhancing maintainability and reducing maintenance cost for the AST assembly 110/210. Using a single bearing to support the floating ring gear 138/238 simplifies the ring gear assembly and further reduces weight. Weight is further reduced by eliminating the transmission assembly compared with the conventional configuration.

DISCUSSION OF POSSIBLE EMBODIMENTS

The following are non-exclusive descriptions of possible embodiments of the present invention.

[Inventors: We will complete this section once we have agreed on claims.]

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air turbine starter (ATS) assembly for an aircraft, comprising:

an ATS mounted to an accessory drive gearbox, wherein:

the ATS comprises:

a set of planetary gears rotationally connected to a turbine assembly;

a floating ring gear rotationally connected to the set of planetary gears, wherein the set of planetary gears is configured to transmit rotational energy from the turbine assembly to the floating ring gear;

an ATS output shaft rotationally connected to the floating ring gear, wherein the floating ring gear is configured to transmit rotational energy from the floating ring gear to the ATS output shaft and wherein the ATS output shaft is configured to pass from the ATS into the accessory drive gearbox; and the accessory drive gearbox comprises:

an overrunning clutch assembly configured to rotationally connect the ATS output shaft to an accessory gearbox shaft when the overrunning clutch assembly engages the ATS output shaft such that the overrunning clutch assembly transmits rotational energy from the ATS output shaft to the accessory gearbox shaft;

wherein the overrunning clutch assembly comprises an outer clutch shaft, a clutch element, and an inner clutch shaft and the overrunning clutch assembly is configured to be removeable from the accessory drive gearbox as a removeable clutch cartridge;

wherein the accessory gearbox further comprises a first side to which the ATS is mounted, and a clutch access cover positioned on a second side of the accessory gearbox opposite from the first side of the accessory gearbox, and wherein the removeable clutch cartridge is configured to be removeable from the accessory gearbox when the clutch access cover is removed while the ATS remains mounted to the accessory gearbox.

2. The ATS assembly of claim 1, wherein the floating ring gear is supported by a single bearing.

3. The ATS assembly of claim 1, wherein the overrunning clutch assembly is configured as a Sprag clutch.

4. The ATS assembly of claim 1, wherein the accessory gearbox is an aircraft mounted accessory gearbox configured to be mounted to an aircraft structure.

5. The ATS assembly of claim 1, wherein the accessory gearbox is an engine mounted accessory gearbox configured to be mounted to an aircraft engine.

6. The ATS assembly of claim 1, wherein:
the ATS further comprises:
an air inlet configured to direct pressurized air into the ATS and across a plurality of turbine blades of the turbine assembly positioned in the ATS, wherein the turbine assembly is configured to rotate when pressurized air is directed across the plurality of turbine blades; and
an air outlet configured to direct pressurized air exiting the plurality of turbine blades out of and away from the ATS;
wherein the overrunning clutch assembly is configured to permit the accessory gearbox shaft to rotate independent of the ATS output shaft when the overrunning clutch assembly is disengaged from the ATS output shaft;
wherein the accessory gearbox shaft is configured to rotationally connect to a power take off shaft of an aircraft engine to transmit rotational energy from the ATS output shaft to the power take off shaft when the overrunning clutch assembly engages the ATS output shaft.

7. An air turbine starter (ATS) assembly, comprising:
an ATS mounted to an accessory drive gearbox, wherein the ATS is configured to facilitate start of an aircraft engine through an ATS output shaft that is configured to pass from the ATS into the accessory drive gearbox and the accessory drive gearbox comprises:
an overrunning clutch assembly configured to rotationally connect the ATS output shaft to an accessory gearbox shaft when the overrunning clutch assembly engages the ATS output shaft such that the overrunning clutch assembly transmits rotational energy from the ATS output shaft to the accessory gearbox shaft in one rotation direction;
wherein the overrunning clutch assembly is configured to permit the accessory gearbox shaft to rotate independent of the ATS output shaft when the overrunning clutch assembly is disengaged from the ATS output shaft;
wherein the accessory gearbox shaft is configured to rotationally connect to a power take off shaft of the aircraft engine to transmit rotational energy from the ATS output shaft to the power take off shaft when the overrunning clutch assembly engages the ATS output shaft;
wherein the overrunning clutch assembly comprises an outer clutch shaft, a clutch element, and an inner clutch shaft and the overrunning clutch assembly is configured to be removeable from the accessory drive gearbox as a removeable clutch cartridge;
wherein the accessory gearbox further comprises a first side to which the ATS is mounted, and a clutch access cover positioned on a second side of the accessory gearbox opposite from the first side of the accessory gearbox, and wherein the removeable clutch cartridge is configured to be removeable from the accessory gearbox when the clutch access cover is removed while the ATS remains mounted to the accessory gearbox.

8. The ATS assembly of claim 7, wherein the ATS comprises:
a set of planetary gears rotationally connected to a turbine assembly; and
a floating ring gear rotationally connected to the set of planetary gears, wherein the set of planetary gears is configured to transmit rotational energy from the turbine assembly to the floating ring gear;
wherein the ATS output shaft is rotationally connected to the floating ring gear and the floating ring gear is configured to transmit rotational energy from the floating ring gear to the ATS output shaft and wherein the ATS output shaft is configured to pass from the ATS into the accessory drive gearbox.

9. The ATS assembly of claim 8, wherein the floating ring gear is supported by a single bearing.

10. The ATS assembly of claim 8, wherein the overrunning clutch assembly is configured as a Sprag clutch.

11. The ATS assembly of claim 7, wherein the accessory gearbox is an aircraft mounted accessory gearbox configured to be mounted to an aircraft structure.

12. The ATS assembly of claim 7, wherein the accessory gearbox is an engine mounted accessory gearbox configured to be mounted to the aircraft engine.

13. The ATS assembly of claim 7, wherein:
the ATS further comprises:
an air inlet configured to direct pressurized air into the ATS and across a plurality of turbine blades of a turbine assembly positioned in the ATS, wherein the turbine assembly is configured to rotate when pressurized air is directed across the plurality of turbine blades; and
an air outlet configured to direct pressurized air exiting the plurality of turbine blades out of and away from the ATS.

* * * * *